Aug. 3, 1965   H. L. PENBERTHY   3,198,618
THROATLESS GLASS FURNACE
Filed March 9, 1955   2 Sheets-Sheet 1
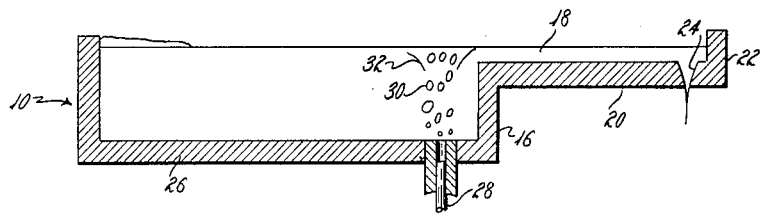
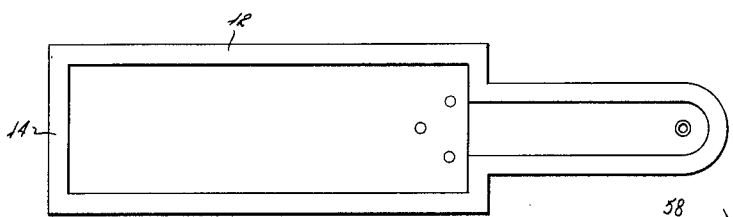
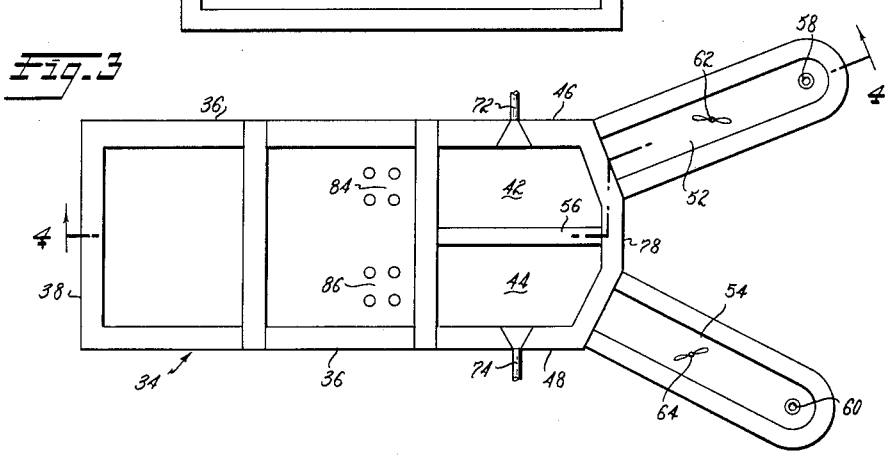
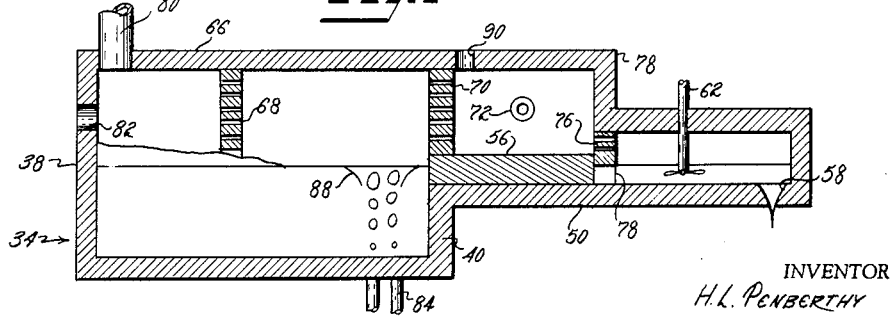
INVENTOR
H.L. PENBERTHY
BY Strauch, Nolan & Diggins
ATTORNEYS 3,198,618
THROATLESS GLASS FURNACE
Harvey L. Penberthy, 2317 47th St. SW., Seattle, Wash.
Filed Mar. 9, 1955, Ser. No. 493,210
5 Claims. (Cl. 65—346)

This invention relates to glass furnaces and more particularly to glass furnaces having no bridge wall or throat therein.

In standard continuous process glass manufacture the material to be treated is charged at one end of the furnace and removed at the other end in the form of molten finished glass, being subjected successively in its passage through the furnace to the operations of melting, fining, and of cooling toward a working temperature. The furnaces that carry out this preparation of the glass generally include three zones roughly corresponding to the three phases of manufacture and generally referred to as the melting, fining and working or conditioning zones. Frequently some of the zones are combined, but in the more modern furnaces barriers have been erected in an attempt to isolate the three steps of the process. In these furnaces a bridge wall is conventionally located between the melting and fining zones and this wall is provided with a submerged throat which permits the passage of glass therethrough. The purpose of the wall is to prevent unmelted glass from entering the fining and subsequently the condition zone and possibly getting into the ware. However, even with the use of such a barrier it has been difficult to prevent all unmelted batch from entering the conditioning zone and in ordinary usage the flow of glass through the throat exercises a strong eroding action on the edges of the wall introducing stones and other impurities into the glass and fairly rapidly wearing away the wall so that replacement is frequently necessary.

This problem has been recognized and several attempts have been made to operate furnaces without bridge walls or throats in a manner described in Amsler Patent Number 1,941,779. Difficulties were experienced, however, in preventing unmelted batch from entering the conditioning zone and as one possible solution the conditioning and fining zones were connected and separated by a shallow channel which was relatively long. While this construction was attended with some measure of success, relatively large tank dimensions were involved along with low rates of production and high operating costs.

I have now found that it is possible to provide a satisfactory throatless glass furnace of reasonable dimensions if a gaseous pump, such as is disclosed in my copending application No. 505,672, now abandoned, is placed in front of a shallow working or conditioning zone. I have also found that substantially the same effect may be achieved with as few as two electrodes similarly mounted before the same shallow zone. With the gaseous pump arrangement there is absolutely no obstruction to the flow of the glass in the furnace so that a maximum furnace output is achieved while at the same time the costs of producing the necessary compressed air or other gas is only a fraction of that necessary to supply electrical power to grid type electrodes. The electrode arrangement, using only a small number of electrodes mounted in a specific relation to a shallow zone, does not decrease the furnace output by any material amount and uses considerably less electrical power than the grid type electrodes which have been proposed in the past.

It is accordingly an object of the present invention to provide a glass furnace having no bridge wall or throat.

It is another object of the present invention to provide a throatless glass furnace which has a shallow conditioning zone, and a pump for producing a rising stream of hot glass in front of such a zone.

It is another object of the present invention to provide a relatively short throatless furnace having a shallow zone and a pump for producing a rising stream of glass in front of such zone.

It is another object of the present invention to provide a throatless glass furnace having a shallow zone and having at least one gaseous pump adjacent the entrance to such zone.

It is another object of the present invention to provide a throatless glass furnace having a shallow conditioning zone and having electrodes placed adjacent to the entrance of such zone wherein the cross sectional area of the electrodes at the entrance to the shallow zone is negligible as compared to the cross sectional area of glass flowing into such zone.

It is another object of the present invention to provide a throatless glass furnace comprising a tank having a main portion with a greater depth than a second portion and having pumping means located in the main portion adjacent the entrance to the second portion and below the level of the floor of the second portion.

It is still another object of the present invention to provide a throatless glass furnace comprising a tank having a main portion with a greater depth than a second portion and having electrodes located in the main portion adjacent the entrance to the second portion and below the level of the floor of the second portion.

Further objects and advantages of the invention will become apparent upon reference to the following specification and claims and appended drawings wherein:

FIGURE 1 is a cross sectional view of a glass furnace utilizing a gaseous pump according to one embodiment of the invention;

FIGURE 2 is a plan view of the glass furnace shown in FIGURE 1;

FIGURE 3 is a plan view of a glass furnace having a plurality of fining zones according to another embodiment of the invention;

FIGURE 4 is a vertical cross section taken along the line 4—4 of FIGURE 2;

Figure 5:
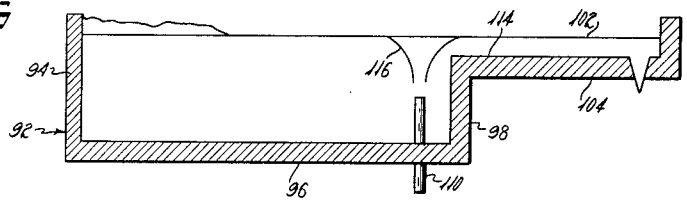
FIGURE 5 is a vertical cross section of a glass furnace utilizing electrodes according to another embodiment of the invention.

Referring to FIGURE 1 there is seen a glass furnace 10 having side walls 12, an end wall 14 and a submerged end wall 16. A shallow working or conditioning zone 18 is attached to the submerged end wall 16 and comprises a bottom wall 20 and end wall 22. This conditioning zone is provided with a withdrawal orifice 24 and the bottom wall 26 of the furnace has a plurality of bubbler tubes 28 mounted therein preferably in the pumper configuration disclosed in my copending application No. 505,672 now abandoned. According to that application the bubbler tubes are placed in a closed configuration and are spaced a distance equal to substantially twice the diameter of the bubbles at the time they leave the orifices.

In operation glass enters the shallow conditioning zone at the entrance thereto at the surface of the glass mass and this is made large enough to provide the withdrawal orifice 24 with the desired volume of glass. The bubbler tubes 28 provide a rising stream of bubbles 30 which create a rising current of glass fanning out at the surface of the glass as shown at 32. This action produces a strong glass current at the surface of the glass mass which forces any unmelted particles of glass back towards the melting zone and effectively prevents such unmelted glass from entering the shallow working or conditioning zone. The arrangement of the gaseous pump and the shallow working zone is such that the maximum effect of the ascending glass currents is exercised right at the inlet to the working zone to provide a highly efficient rejection of unmelted glass.

Figure 7:
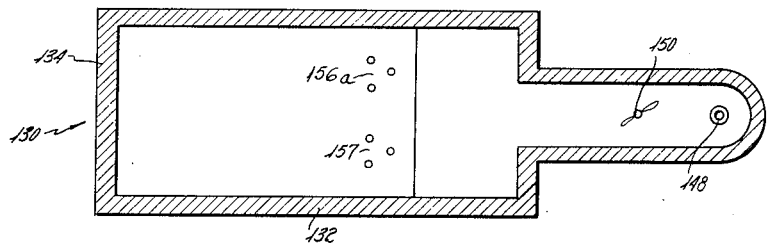
FIGURE 7 is a horizontal section of a glass furnace according to another embodiment of the invention.
Figure 8:
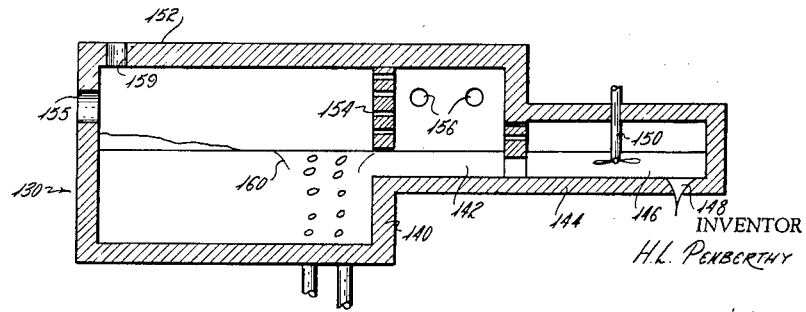
FIGURE 8 is a vertical section of the furnace of FIGURE 7.

The embodiment of the invention shown in FIGURES 1 and 2 is particularly well adapted to existing furnaces since the only modification necessary is the removal of the bridge wall and the installation of the bubblers. The maximum temperature is still applied in the fining zone immediately adjacent the bubblers and thus no change in the heating arrangement is necessary. That is to say, the furnace of FIGURE 1, without the bubbler tube, would be a conventional furnace if provided with a bridge wall and submerged throat intermediate the end wall 16 and the opposed end wall at the position of the floating batch. Such a furnace is normally divided into a melting zone at the batch side of the bridge wall, a fining zone at the other side of the bridge wall and a shallow working or conditioning zone at 18. This conventional furnace may then be converted to a furnace constructed according to the present invention by simply installing bubbler tubes 28 and removing the bridge wall. Under such circumstances the bubbler tubes produce the rising stream of glass at the submerged wall which is located at the interface of the fining and working zones.

Where further furnace modification is feasible or where a furnace is being originally constructed, the embodiment of the invention shown in FIGURES 7 and 8 may be used to advantage. Referring to these figures, there is seen a furnace 130 having side walls 132, an end wall 134 and a submerged end wall 140. Adjacent the wall 140 there is provided a shallow fining zone 142 having a bottom wall 144 which extends outward beyond the fining zone beneath the conditioning zone 146. The conditioning zone is provided with a draw-off orifice 148 and may be provided with a stirrer 150.

The furnace is provided with a roof 152 and with a perforated shadow wall 154 between the melting and fining zones. A plurality of burners 156 enter the side walls of the fining chamber. An exhaust 159 is provided in the roof 152 for removing spent gases of combustion and a port 155 is provided in the conventional manner for introduction of batch into the melting zone. A pair of gaseous pumps 156a and 157 is arranged in the bottom of the tank adjacent the inlet to the shallow fining zone 142.

In operation hot gases of combustion are delivered to the fining zone 142 from the burners 156 and these gases flow through the perforated shadow wall 154 to the melting zone from which they are removed by the exhaust 159. The gaseous pumps 156a and 157 produce rising streams of glass adjacent the inlet to the shallow refining zone 142 and these streams fan out as shown at 160, in the same manner as illustrated in FIGURE 1, to prevent unmelted batch from entering the shallow fining zone 142.

Referring to FIGURES 3 and 4 there is shown another embodiment of the invention comprising a glass furnace 34 having side walls 36, an end wall 38 and a submerged end wall 40. Adjacent the wall 40 there are provided a pair of shallow fining zones 42 and 44 having side walls 46 and 48 and a bottom wall 50 which extends outward beyond the working zones beneath conditioning zones 52 and 54. A low barrier 56 is provided between the shallow fining zones 42 and 44 and the conditioning zones 52 and 54 are provided with withdrawal orifices 58 and 60 and may be provided with stirrers 62 and 64.

The furnace is provided with a roof 66 and with perforated shadow walls 68 and 70 in the melting zone and between the fining and conditioning zones, respectively.

A plurality of burners 72 and 74 enter the side walls 46 and 48 of the shallow fining zones 42 and 44. A further shadow wall 76 is provided between the fining zones 42 and 44 and the conditioning zones 52 and 54 and this wall is substantially aligned with the end wall 78 of the fining zones. An exhaust 80 is provided in the roof 66 in the melting zone for removal of the spent gases of combustion and an opening 82 is provided in the conventional manner for introduction of batch into the melting zone. A pair of gaseous pumps 84 and 86 is arranged in the tank floor adjacent the inlet to each of the shallow fining zones 42 and 44.

In operation hot gases of combustion are delivered to the fining zones 42 and 44 by the burners 72 and 74 and these gases flow through the perforated shadow walls 70 and 68 to the melting zone from which they are removed by the exhaust 80. The gaseous pumps 84 and 86 produce rising streams of glass adjacent the inlets to the shallow fining zones 42 and 44 and these streams produce a fanning action, indicated at 88, in the same manner as described in connection with FIGURES 1 and 2. This action prevents unmelted glass from entering the shallow fining zones 42 and 44 which are immediately adjacent to the gaseous pumps and to the surface of the glass mass. Where it is desired to utilize the glass furnace 34 to produce colored glass, colorant may be introduced into the fining zones through ports 90 from which it is fed to the conditioning zones 52 and 54 to be fully mixed by the stirrers 62 and 64.

The greatest temperature in this furnace is provided in the fining zones 42 and 44 and the gases of combustion flow from here through the furnace in a direction counter to the movement of the glass mass.

The gases of combustion thus flow through the perforated shadow walls 70 and 68 and these walls act to minimize transfer of heat through radiation. A large difference in temperature is thus maintained between the fining zones 42 and 44 in the melting zone without a large heat loss through radiation. The shadow walls may preferably be of the type having non-line of sight passages therethrough.

Figure 6:
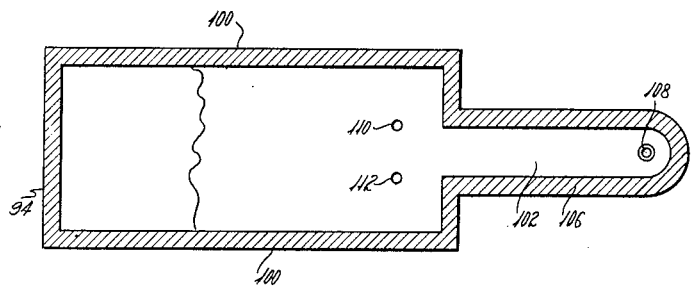
FIGURE 6 is a plan view of the furnace of FIGURE 5.

Referring to FIGURES 5 and 6 there is shown a still further embodiment of the invention generally similar to that seen in FIGURES 1 and 2. This embodiment comprises a glass furnace 92 having an end wall 94, bottom wall 96, submerged end wall 98, and side walls 100. A shallow conditioning zone 102 comprising a bottom wall 104 and side walls 106 is attached to the submerged end wall 98 and is provided with a withdrawal orifice 108. This furnace is of the type which would normally contain a bridge wall dividing the deeper portion of the tank into melting and fining zones as discussed in connection with FIGURES 1 and 2. According to the invention, however, this wall is removed and a pair of electrodes 110 and 112 is mounted adjacent the inlet to the shallow conditioning zone. These electrodes preferably do not extend above the upper surface 114 of the bottom wall 104 of the shallow conditioning zone 102.

In operation electrical power is supplied to the electrodes 110 and 112 and they create a localized heating effect adjacent the entrance to the conditioning zone 102 to create a rising current of glass which fans out at the surface of the glass mass as shown at 116. This rising current and fanning action acts as in the embodiment of FIGURES 1 and 2 to prevent any unmelted batch from entering the conditioning zone 102. It will be seen from reference to FIGURE 5 that the placement of the electrodes 110 and 112 so that they do not rise above the upper surface 114 of the bottom wall 104 of the conditioning zone 102 permits the furnace to be utilized at full capacity without the electrodes exercising a physical barrier action to decrease the flow of glass. In addition, the entrance to the conditioning zone is so placed with relation to the rising current of glass as to allow the rising current to exercise a maximum glass current barrier action in preventing unmelted batch from entering the conditioning zone. Since the electrodes do not rise above the inlet to the conditioning zone a large number may be used without decreasing the flow of glass. While vertical electrodes are illustrated, it will be obvious to those skilled in the art that horizontal or inclined electrodes may also be used so long as they do not impede the flow of glass into the conditioning zone.

It will be apparent from the foregoing that I have provided a full capacity throatless glass furnace wherein unmelted batch is prevented from entering the conditioning zone. The energy necessary to achieve this is obtained at a minimum expense and furnace output is not diminished in any respect.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A throatless glass furnace comprising in combination a tank forming melting, fining and conditioning zones which are in communiaction with one another at the surface of a glass mass in said tank, said fining zone having a greater depth than the contiguous shallow conditioning zone, said change in depth being effected by a submerged wall, and means substantially at the floor of said fining zone adjacent said submerged wall for creating a stream of molten glass rising from the bottom of said fining zone along said submerged wall to the surface of the glass mass where it mushrooms out to create an unimpeded flow of surface glass towards said melting zone, said rising stream of molten glass and said flow of surface glass serving to prevent unmolten batch from entering said conditioning zone.

2. A throatless glass furnace as set out in claim 1 wherein said means for creating a stream of molten glass comprises bubble producing means.

3. A throatless glass furnace as set out in claim 1 wherein said means for creating a stream of molten glass comprises bubble producing means arranged in at least one closed configuration wherein the individual bubble producing means in said configuration cooperate to provide a single rising stream of molten glass which mushrooms out at the surface of the glass mass.

4. A throatless glass furnace as set out in claim 1 wherein said means for creating a stream of molten glass comprises electrode means for producing Joule effect heat.

5. A throatless glass furnace comprising in combination, a tank for containing a glass mass and forming melting, fining and conditioning zones which are in communication with one another at the surface of said glass mass, said melting and fining zones having a first depth, said conditioning zone having a second depth, bottom walls for each of said zones, the bottom wall for said conditioning zone being at a higher level than the bottom walls of said melting and fining zones and connected to the bottom wall of said fining zone by means of an end wall submerged in said glass mass, and means substantially at the bottom wall of said firing zone adjacent said end wall for creating a stream of molten glass rising from the bottom of said fining zone to the surface of the glass mass where it mushrooms out to create an unimpeded flow of surface glass towards said melting zone, said rising stream of molten glass and said flow of surface glass serving to prevent unmolten batch from entering said conditioning zone.

References Cited by the Examiner

UNITED STATES PATENTS

| | | | |
|---|---|---|---|
| 1,832,063 | 11/31 | Thompson | 65—336 |
| 1,870,242 | 8/32 | Drake | 263—15 |
| 1,880,541 | 10/32 | Wadman | 65—135 |
| 1,937,390 | 11/33 | McKinley et al. | 65—135 |
| 1,941,779 | 1/34 | Amsler | 65—137 |
| 1,953,034 | 3/34 | Willetts | 65—335 |
| 2,162,983 | 6/39 | Sullivan | 65—346 X |
| 2,203,269 | 6/40 | Mulholland | 65—135 |
| 2,225,616 | 12/40 | Borel | 13—6 |
| 2,313,217 | 3/43 | Borel | 65—347 |
| 2,387,222 | 10/45 | Wright | 65—22 |
| 2,593,197 | 4/52 | Rough | 65—335 X |
| 2,616,221 | 11/52 | Hanson | 65—178 |
| 2,773,111 | 12/56 | Arbeit et al. | 65—136 X |

FOREIGN PATENTS 611,401   10/48   Great Britain.

DONALL H. SYLVESTER, *Primary Examiner.*

WILLIAM J. STEPHENSON, CHARLES R. HODGES, MICHAEL V. BRINDISI, BENJAMIN BENDETT, IVAN R. LADY, MORRIS O. WOLK, *Examiners.*

UNITED STATES PATENT OFFICE
CERTIFICATE OF CORRECTION

Patent No. 3,198,618                                              August 3, 1965

Harvey L. Penberthy

It is hereby certified that error appears in the above numbered patent requiring correction and that the said Letters Patent should read as corrected below.

Column 1, line 28, for "condition" read -- conditioning --; column 5, line 29, for "communiaction" read -- communication --; column 6, line 17, for "firing" read -- fining --.

Signed and sealed this 26th day of April 1966.

(SEAL)
Attest:

ERNEST W. SWIDER
Attesting Officer

EDWARD J. BRENNER
Commissioner of Patents